United States Patent [19]
Odom

[11] Patent Number: 6,098,124
[45] Date of Patent: Aug. 1, 2000

[54] ARBITER FOR TRANSFERRING LARGEST ACCUMULATED DATA BLOCK OUTPUT FROM DATA BUFFERS OVER SERIAL BUS

[75] Inventor: B. Keith Odom, Georgetown, Tex.

[73] Assignee: National Instruments Corporation, Austin, Tex.

[21] Appl. No.: 09/058,090

[22] Filed: Apr. 9, 1998

[51] Int. Cl.[7] .................................................. G06F 13/14
[52] U.S. Cl. .......................... 710/52; 710/107; 710/240
[58] Field of Search .......................... 710/52, 107, 240; 711/158; 370/230, 395

[56] References Cited

U.S. PATENT DOCUMENTS

| | | | |
|---|---|---|---|
| 4,082,922 | 4/1978 | Chu | 370/230 |
| 5,367,654 | 11/1994 | Furukawa et al. | 711/158 |
| 5,724,351 | 3/1998 | Chao et al. | 370/395 |
| 5,796,961 | 8/1998 | O'Brien | 710/107 |
| 5,916,309 | 6/1999 | Brown et al. | 710/52 |

*Primary Examiner*—Thomas C. Lee
*Assistant Examiner*—Harold Kim
*Attorney, Agent, or Firm*—Conley, Rose & Tayon P.C.; Jeffrey C. Hood

[57] ABSTRACT

An improved system and method for transferring data over a serial bus. Incoming data is stored into data buffers with a dynamically variable size. The size of each data buffer may be adjusted as new data come in. Data with the same originating address are stored in the same data buffer. An arbiter, coupled to the data buffers and to the serial bus, monitors each of the data buffers and the availability of the serial bus. When the serial is available, the arbiter transfers data from one of the data buffers according to some predetermined priority. For example, the largest buffer may have the highest priority. Such an assignment of priority makes very efficient use of the serial bus since larger amounts of data have less overhead and are thus more efficient to transfer. In addition, while data is transferring out of one of the data buffers, data is accumulating in all the other buffers. This makes the other buffers larger and more efficient to transfer upon later availability of the serial bus. The arbiter may also include logic for determining how long it has been since the last time data was transferred out of each data buffer which ensures not starving data in the data buffers.

12 Claims, 3 Drawing Sheets

Virtual instrumentation system with a remote PC connected through a serial bus to another PC Virtual instrumentation system with a remote PC connected through a serial bus to another PC Block diagram of a PC DAQ system for virtual instrumentation Block diagram of a system for transferring data over a serial bus

6,098,124

ARBITER FOR TRANSFERRING LARGEST ACCUMULATED DATA BLOCK OUTPUT FROM DATA BUFFERS OVER SERIAL BUS

FIELD OF THE INVENTION

The present invention relates to measurement systems, and more particularly to a system and a method for transferring data over a serial bus.

DESCRIPTION OF THE RELATED ART

Modern instrumentation systems are moving from dedicated, stand-alone hardware instruments, such as oscilloscopes, digital multimeters, etc., to a concept referred to as virtual instrumentation. Virtual instrumentation systems comprise instrumentation hardware and/or software which operate in conjunction with general purpose computers.

Scientists and engineers often use data measurement and acquisition (DAQ) systems to perform a variety of functions, including laboratory research, process monitoring and control, data logging, analytical chemistry, tests and analysis of physical phenomena, and control of mechanical or electrical machinery, to name a few examples. Generally, a process or device being monitored or otherwise controlled, referred to as the unit under test (UUT), is interfaced to one or more hardware input/output (I/O) interface devices. The I/O interface options include instrumentation associated with the GPIB (general purpose interface bus), the VXI bus, the PXI bus, the RS232 protocol, and a data acquisition (DAQ) board, as well as others as known to those skilled in the art.

DAQ systems typically include transducers for asserting and measuring electrical signals, signal conditioning logic to perform amplification, isolation, and filtering, and other hardware for receiving analog signals and providing them to a processing system, such as a computer. The processing system generally comprises a computer system having an I/O bus and corresponding connectors or slots for receiving I/O boards. Typically, plug-in DAQ boards are plugged into the I/O slots of a computer system for interfacing the UUT with the processing system. The computer may further include analysis hardware and software for analyzing and appropriately displaying the measured data.

In instrumentation applications, as well as others, often there is a need for the I/O function to be physically located remote from the host computer. For example, a data acquisition (DAQ) device may be required to be located in a test chamber which is separated by some distance from the host computer controlling it. One solution would be to connect the two computers with a high speed serial bus, such as the IEEE-1394 bus. In these systems it is desirable to have an efficient way of transmitting data over the serial bus. The remote computer may often be receiving data from several DAQ boards at the same time. All of the data must then be transmitted over the single serial bus. A method and apparatus that can accomplish this efficiently are thus desired.

SUMMARY OF THE INVENTION

The present invention comprises an improved system and method for transferring data over a serial bus. Incoming data is stored into data buffers with a dynamically variable size. The size of each data buffer is adjusted as new data arrives. Data with the same originating address are stored in the same data buffer. An arbiter, coupled to the data buffers and to the serial bus, monitors each of the data buffers and the availability of the serial bus. When the serial bus is available, the arbiter transfers data from one of the data buffers according to a predetermined priority. In the preferred embodiment, the arbiter monitors the size or amount of accumulated data in each of the buffers, and the largest buffer, i.e., the buffer with the most data, has the highest priority. Such an assignment of priority makes very efficient use of the serial bus, since larger amounts of data have less overhead and are thus more efficient to transfer. In addition, while data is being transferred out of one of the data buffers, data is accumulating in all the other buffers. The other buffers are thus larger and more efficient to transfer upon later availability of the serial bus. The arbiter also preferably includes logic for determining the length of time or latency since the last time data was transferred out of each data buffer. The arbiter operates to transfer data out when this latency is reached, which prevents starving of the data buffers.

Broadly speaking, the present invention contemplates a DAQ system and method for transferring data over a serial bus. The DAQ system includes a plurality of data buffers, each of which includes inputs for receiving data. The plurality of data buffers are each configured to store received data blocks according to an address of the data block. Furthermore, each of the plurality of data buffers is configured to store data blocks having different or varying sizes. The plurality of data buffers preferably comprises random access memory.

The plurality of data buffers are coupled to a serial bus, which is configured to receive data from one of the data buffers. The serial bus is preferably a high-speed IEEE 1394 serial bus. An arbiter is coupled to the plurality of data buffers. The arbiter monitors the amount of accumulated data in each of the buffers and also monitors the serial bus for availability of the serial bus. When the serial bus is determined to be available, the arbiter selectively provides a data block output from one of the plurality of data buffers. In the preferred embodiment, the arbiter selects the largest data block for transferring over the high-speed serial bus. In an alternative embodiment, the arbiter may also monitor the length of time or latency since the last time data was transferred from the data buffers. This ensures that data in a buffer is transferred after having been there for a given amount of time. The plurality of data buffers continue to accumulate data while the serial bus is receiving data from one of the plurality of data buffers.

BRIEF DESCRIPTION OF THE DRAWINGS

Other objects and advantages of the invention will become apparent upon reading the following detailed description and upon reference to the accompanying drawings in which.

Figure 1:
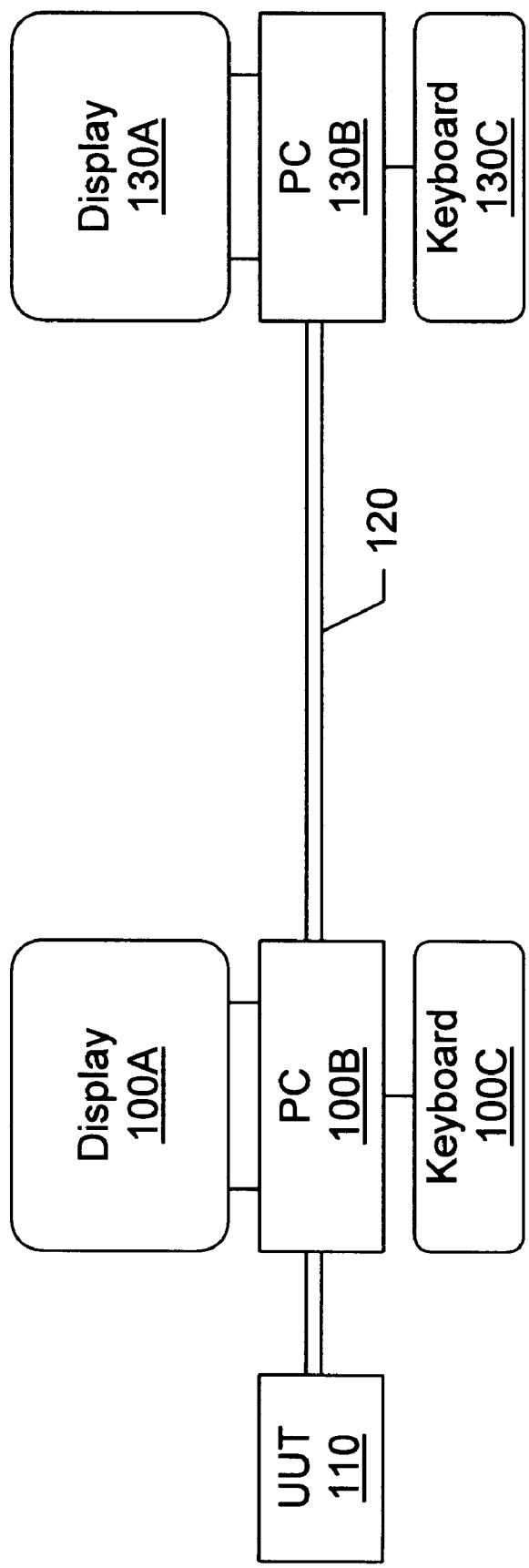
FIG. 1 shows a virtual instrumentation system with a remote PC connected through a serial bus to another PC.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Incorporation by Reference

U.S. patent application Ser. No. 60/052,123, titled "Wide Area Serial PCI" and filed Jul. 10, 1997 and which is assigned to National Instruments, is hereby incorporated by reference in its entirety.

Turning now to the figures, FIG. 1 shows computer system 100 connected to Unit Under Test (UUT) 110. UUT 110 may represent a chemical process, a physical phenomenon, a mechanical device, or an electrical device, to name a few examples. Generally, UUT 110 is monitored and controlled by interfacing UUT 110 with a card comprised in one of the input/output slots of computer system 100. Data are transferred from UUT 110 to computer system 100 for analysis, storage and presentation.

In some cases, it is desirable to collect the data with one computer system and then transfer the collected data to a second computer system. This may be the case, for example, when the data are measured in an environment with extreme conditions, such as pressure, humidity, and temperature, where a regular computer system would not be able to function properly. In such cases, a more rugged computer system is used. In FIG. 1, computer system 100 is a rugged computer system that is placed in close proximity to UUT 110 for the collection of data. After collection, the data is transferred over high-speed serial bus 120 to second computer system 130. Second computer system is in an environment with normal temperature, humidity, pressure, etc. Computer system 130 is easily accessible by a user for analyzing and/or displaying the collected information.

The present invention comprises an improved system and method for transferring data over a serial bus. The present invention may be used in the system of FIG. 1, or may be used in other systems where data received from multiple sources is transferred over a serial bus.

Figure 2:
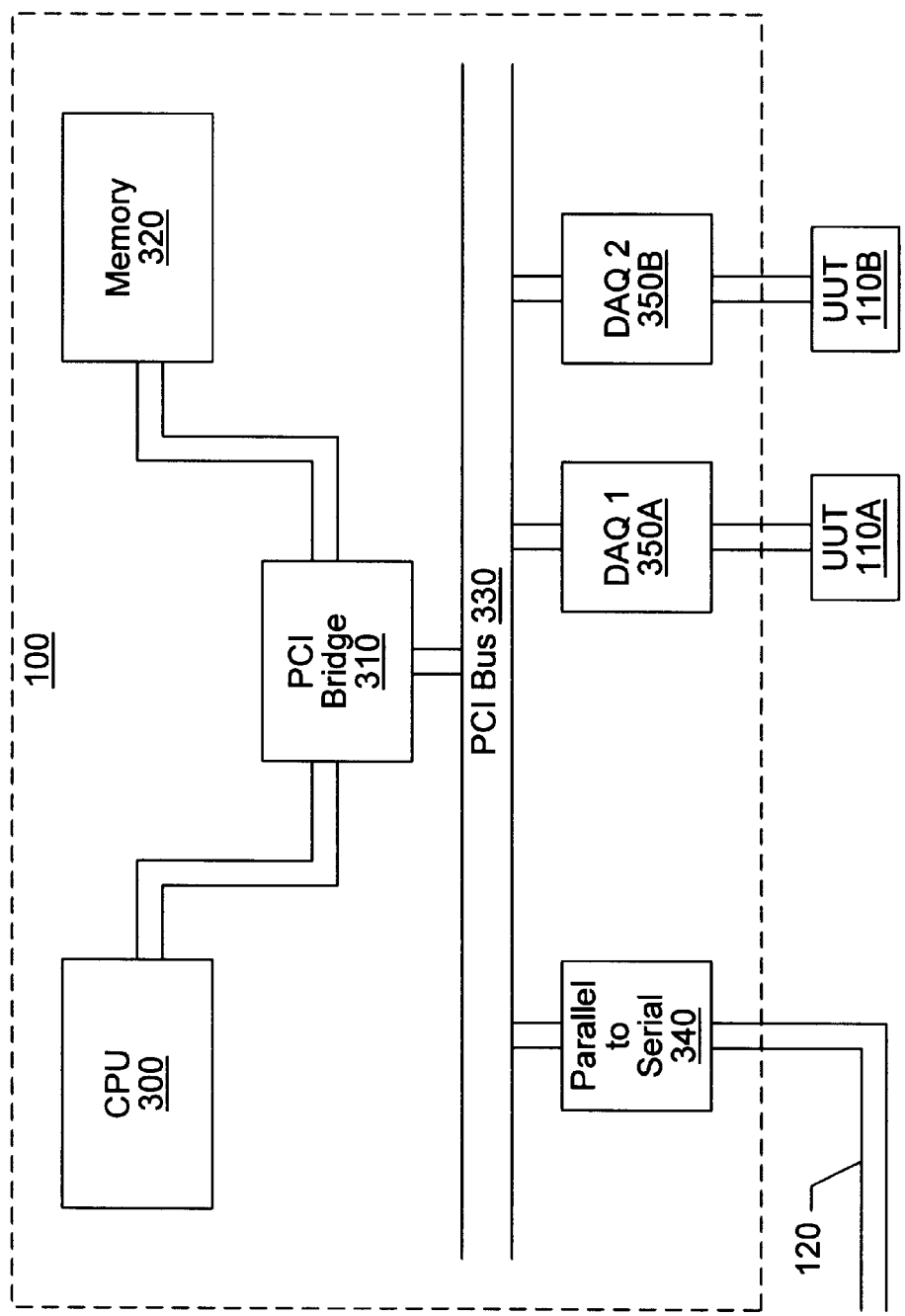
FIG. 2 shows a block diagram of a PC DAQ system for virtual instrumentation.

FIG. 2 shows a block diagram of computer system 100. Data acquisition (DAQ) devices or boards 350 are placed into I/O slots of computer system 100, whereby DAQ boards 350 are directly connected to I/O bus 330. In the preferred embodiment, I/O bus 330 is the PCI bus. FIG. 2 shows two DAQ boards labeled 350A and 350B, and the two DAQ boards are collectively referred to as DAQ boards 350. It is noted that computer system 100 may include any number of DAQ boards 350. Each of the DAQ boards 350 may include any number of channels for receiving data.

DAQ boards 350 are responsible for collecting and digitizing data from one or more UUTs 110. DAQ boards 350 can receive/transmit data from/to the computer system's random access memory (RAM) 320 through PCI I/O bus 330. PCI bridge 310 interfaces central processing unit (CPU) 300 and system RAM 320 with PCI bus 330. DAQ boards 350 receive control signals from CPU 300 that control the boards' operation. DAQ boards also operate as bus masters on the PCI bus 330. As DAQ boards 350 collect data from UUTs 110, the data are transferred over the PCI bus 330 to parallel-to-serial (PTS) converter 340. PTS converter 340 is configured to receive data in parallel from DAQ boards 350 and/or system memory 320 and convert the parallel data into serial data for transferring over high-speed serial bus 120.

Figure 3:
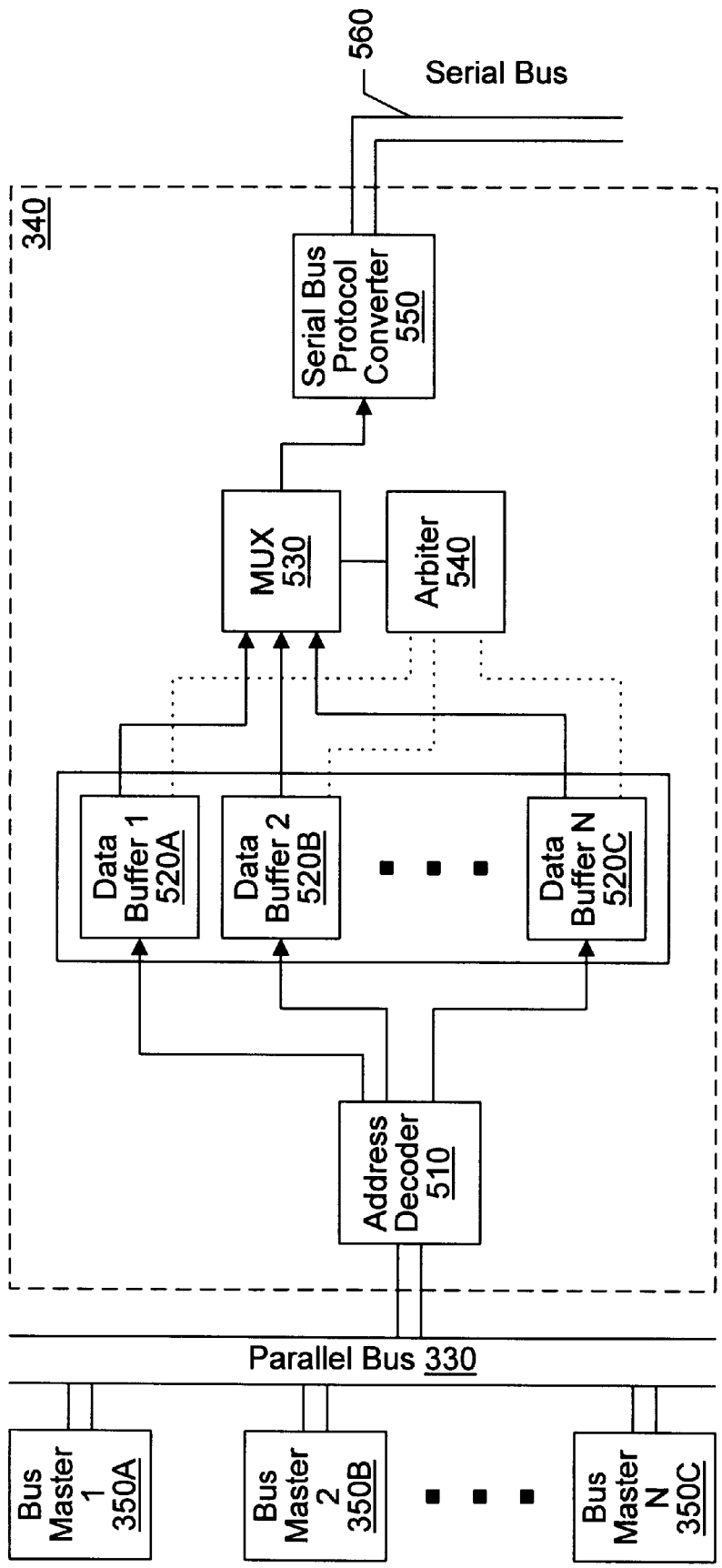
FIG. 3 shows a block diagram of a system for transferring data over a serial bus.

Turning now to FIG. 3, DAQ boards 350, referred to more generally as bus masters 350, are shown connected to parallel bus 330. As noted above, in the preferred embodiment, the parallel bus is the PCI bus. In a preferred embodiment, bus masters 350 may be, for example, DAQ boards connected to UUTs for collecting and digitizing data. Digital data from bus masters 350 is transferred through parallel bus 330 to the PTS converter 340. The data is received by an address decoder 510 in the PTS converter 340. Bus masters 350 transfer the data upon collection and upon availability of shared parallel bus 330. In a preferred embodiment, parallel bus 330 is a Peripheral Component Interconnect (PCI) bus.

Address decoder 510 is configured to receive data from bus masters 350 through parallel bus 330. Address decoder 510 determines the origin of the incoming data and reroutes each incoming packet accordingly. Dynamic data buffers 520 are configured to receive the data. Each of dynamic data buffers 520 is configured to receive data from one of bus masters 350. The size of each of dynamic data buffers 520 is dynamically adjusted as more data arrives. Thus, for a respective dynamic data buffer 520, the size of the respective dynamic data buffer 520 is dynamically adjusted as more contiguous data is received, i.e., as more data is received which is contiguous with data already stored in the respective data buffer. Data buffers 520 store contiguous blocks of data of varying sizes.

Arbiter 540 is coupled to each of dynamic data buffers 520. In a preferred embodiment, arbiter 540 monitors data accumulation in each of data buffers 520 and then selects the data buffer with the largest amount of data for transferring over serial bus 560. In the preferred embodiment of the present invention, the PTS converter 340 includes counters for each of the buffers which count for each data byte received. The arbiter 540 monitors data accumulation in each of the data buffers 520 by examining the counter value for each buffer. In an alternate embodiment, the PTS converter 340 maintains a pointer which points to the end of each buffer, and each pointer changes as the respective buffer grows. In this alternate embodiment, the PTS converter 340 examines the pointers for each buffer to determine which buffer has accumulated the most data.

It is most efficient for a serial bus to transfer large amounts of contiguous data. Less overhead is needed since contiguous data share destination address, size information, etc., which is information that is appended to each serial packet. Since the data in the largest data buffer is being transferred over the serial bus, the other data buffers continue to accumulate data. In this manner, the largest possible data packets are transferred each time, which makes the most efficient use of serial bus 560.

In an alternative embodiment, the arbiter also includes logic, preferably counters, for monitoring the length of time data has been accumulating in each buffer since the last time data transfer took place out of that buffer. Arbiter 510 then uses this information to prevent starving buffers with a small amount of data that have not been transferred for a given amount of time. In this embodiment, the data buffer with the largest amount of data is generally sent. However, if a buffer has not performed a transfer for a predetermined period of time, then that buffer gains priority. Arbiter 540 may also use additional criteria for determining which buffer to transfer, for example, a predetermined priority order among the buffers.

Multiplexer (MUX) 530 is responsible for selecting one of data buffers 520 and transferring the data from that buffer to Serial Bus Protocol Converter (SBPC) 550. MUX 530 is directly coupled to arbiter 540 which controls the selection of MUX 530. SBPC 550 receives the data from the selected data buffer and converts the data to appropriate serial data packets that can be sent over serial bus 560. SBPC 550 converts the data using the appropriate serial bus protocol. In a preferred embodiment, serial bus 560 is a high-speed IEEE 1394 serial bus or IEEE 1394.2 serial bus.

What is claimed is:

1. A system for transferring data over a serial bus, said system comprising:

a plurality of data buffers, wherein said plurality of data buffers each includes inputs for receiving data, wherein said plurality of data buffers each store a received data block according to an address of said data block, wherein each of said plurality of data buffers is configured to store data blocks having different size;

said serial bus coupled to said plurality of buffers, wherein said serial bus is configured to receive data from one of said plurality of buffers; and an arbiter coupled to each of said plurality of data buffers, wherein said arbiter monitors an amount of accumulated data stored in each of said buffers, wherein said arbiter monitors said serial bus for availability of said serial bus and wherein, when said serial bus is determined to be available, said arbiter selectively provides a largest accumulated data block output from one of said plurality of data buffers.

2. The system of claim 1, wherein said plurality of data buffers comprise random access memory.

3. The system of claim 1, wherein said one or more of said plurality of data buffers accumulate data while said serial bus is receiving data from one of said plurality of data buffers.

4. The system of claim 1, wherein said plurality of data buffers include a first data buffer storing a first data block having a first size, and wherein said plurality of data buffers includes a second data buffer storing a second data block having a second size, wherein said second size is greater than said first size, wherein said arbiter selects said second data buffer to transfer said second data block prior to selecting said first data buffer to transfer said first data block.

5. The system of claim 1, wherein said serial bus is a high speed IEEE 1394 serial bus.

6. The system of claim 1, wherein said arbiter monitors a length of time since each of said buffers has transferred data;

wherein said arbiter is operable to provide a data block output from a respective data buffer when said respective data buffer has not transferred data for a predetermined period of time.

7. A method for transferring data over a serial bus, said method comprising:

storing a plurality of received data blocks into a plurality of data buffers, wherein each of said plurality of data buffers stores each of a received data block according to an address of said data block, wherein each of said plurality of data buffers is configured to store data blocks having different sizes;

monitoring an amount of data accumulated in each of said plurality of buffers;

determining when the serial bus is available for a transfer;

selecting a selected one of said plurality of data buffers which has the largest amount of accumulated data;

transmitting accumulated data in said selected one of said plurality of data buffers over the serial bus, wherein said accumulated is transmitted when said serial bus is determined to be available.

8. The method of claim 7, wherein said plurality of data buffers comprise random access memory.

9. The method of claim 7, wherein said storing comprises storing a data block having a first size in a first data buffer, and wherein said storing comprises storing a data block having a second size in a second data buffer, wherein said second size is greater than said first size, wherein in selecting said selected one of said plurality of data buffers comprises selecting said second data buffer.

10. The method of claim 7, further comprising accumulating data in said plurality of data buffers while said serial bus is transmitting data from said selected one of said plurality of data buffers.

11. The method of claim 7, wherein the step of transferring said accumulated data over a serial bus comprises transmitting said data using the IEEE 1394 protocol.

12. The method of claim 7, further comprising: monitoring a length of time since each of said buffers has transferred data; and providing a data block output from a respective data buffer when said respective data buffer has not transferred data for a predetermined period of time.

* * * * *